(12) United States Patent
Lizama et al.

(10) Patent No.: US 11,618,934 B2
(45) Date of Patent: Apr. 4, 2023

(54) RECOVERY OF COPPER FROM HEAP LEACH RESIDUES

(71) Applicant: TECK METALS LTD., Vancouver (CA)

(72) Inventors: Hector Lizama, Castlegar (CA); Danilo Arrué, Las Condes (CL)

(73) Assignee: TECK METALS LTD., Vancouver (CA)

( * ) Notice: Subject to any disclaimer, the term of this patent is extended or adjusted under 35 U.S.C. 154(b) by 442 days.

(21) Appl. No.: 16/758,192

(22) PCT Filed: Mar. 14, 2018

(86) PCT No.: PCT/CA2018/050307
§ 371 (c)(1),
(2) Date: Apr. 22, 2020

(87) PCT Pub. No.: WO2019/084669
PCT Pub. Date: May 9, 2019

(65) Prior Publication Data
US 2020/0340077 A1    Oct. 29, 2020

Related U.S. Application Data

(60) Provisional application No. 62/579,743, filed on Oct. 31, 2017.

(51) Int. Cl.
*C22B 15/00*    (2006.01)
*C22B 3/08*    (2006.01)
(Continued)

(52) U.S. Cl.
CPC .......... *C22B 15/0071* (2013.01); *C22B 3/08* (2013.01); *C22B 3/18* (2013.01); *C22B 3/26* (2021.05);
(Continued)

(58) Field of Classification Search
CPC ......... C22B 15/0071; C22B 3/08; C22B 3/18; C22B 3/26; E21B 34/02; E21B 43/28;
(Continued)

(56) References Cited

U.S. PATENT DOCUMENTS

| 3,441,316 A | 4/1969 | Hannifan et al. |
| 3,959,436 A * | 5/1976 | Watts ........................ C22B 3/06 423/41 |
| 6,207,443 B1 | 3/2001 | King |

FOREIGN PATENT DOCUMENTS

| CL | 2009002122 A1 | 5/2010 |
| CL | 2014002920 A1 | 12/2014 |

(Continued)

OTHER PUBLICATIONS

International Patent Application No. PCT/CA2018/050307, International Preliminary Report on Patentability dated May 14, 2020.
(Continued)

*Primary Examiner* — Steven J Bos
(74) *Attorney, Agent, or Firm* — Borden Ladner Gervais LLP; Geoffrey deKleine

(57) ABSTRACT

A process for recovering copper from heap leach residues containing residual copper, includes identifying a production zone within the heap leach residues for secondary leaching, drilling wells into the heap at locations suitable for delivering leach solution into the production zone, injecting the leach solution including ferric ions through the wells and aerating the production zone to facilitate oxidative reactions within the production zone, and collecting effluent from the heap for copper recovery therefrom.

25 Claims, 13 Drawing Sheets

(51) Int. Cl.
  *C22B 3/18*   (2006.01)
  *E21B 34/02*  (2006.01)
  *E21B 43/28*  (2006.01)
  *E21B 43/30*  (2006.01)
  *E21B 47/00*  (2012.01)
  *E21B 49/00*  (2006.01)
  *G01V 3/00*   (2006.01)
  *C22B 3/26*   (2006.01)

(52) U.S. Cl.
  CPC .............. *E21B 34/02* (2013.01); *E21B 43/28* (2013.01); *E21B 43/281* (2013.01); *E21B 43/30* (2013.01); *E21B 47/00* (2013.01); *E21B 49/00* (2013.01); *G01V 3/00* (2013.01)

(58) Field of Classification Search
  CPC ........ E21B 43/281; E21B 43/30; E21B 47/00; E21B 49/00; G01V 3/00
  See application file for complete search history.

(56) References Cited

FOREIGN PATENT DOCUMENTS

| | | | |
|---|---|---|---|
| WO | WO-01/18264 | * | 3/2001 |
| WO | 2005090748 A1 | | 9/2005 |

OTHER PUBLICATIONS

International Patent Application No. PCT/CA2018/050307, International Search Report and Written Opinion dated Jul. 19, 2018.
Petersen., "Heap Leaching as a Key Technology for Recovery of Values From Low-Grade Ores—A Brief Overview," Hydrometallurgy, Oct. 2016, vol. 165, pp. 206-212.

\* cited by examiner

RECOVERY OF COPPER FROM HEAP LEACH RESIDUES

TECHNICAL FIELD

The present application relates to recovery of copper from heap leach residues.

BACKGROUND

Copper sulphide deposits near the surface of the earth react with percolating groundwater. The chemical reactions result in oxidation of the primary copper sulphide minerals, forming a region of secondary copper sulphide minerals, or even a region of copper oxide minerals. These two regions of mineral alteration are known as the "oxide cap" and the "supergene", both of which sit above the underlying unaltered "hypogene". The oxide cap is the topmost layer, composed predominantly of copper oxide and copper sulphate minerals. Below the oxide cap is the supergene zone, composed predominantly of secondary copper sulphide minerals, such as chalcocite ($Cu_2S$) and covellite ($CuS$). The hypogene zone is the bottommost layer, composed predominantly of primary copper sulphide minerals, such as chalcopyrite ($CuFeS_2$) and bornite ($Cu_5FeS_4$).

Heap leaching can be used to extract copper from primary and secondary copper sulphide minerals. In heap leaching, ore is stacked in leach pads to a specified height. These ore piles, also known as "heaps", are irrigated with a solution rich in acid and poor in dissolved copper ions. Chemical reactions within the heap consume acid and release copper ions from the ore, resulting in a solution exiting from the bottom of the heap that is poor in acid and rich in dissolved copper ions. Typically, the acid utilized is sulphuric acid.

The irrigating solution, which is rich in acid, may be a raffinate solution from a solvent extraction plant. The solution exiting the bottom of the heap, which is rich in copper ions, is termed pregnant leach solution (PLS). In situations where the ore contains chalcocite ($Cu_2S$) and covellite ($CuS$), otherwise known as secondary sulphides of copper, the heaped ore is typically aerated from the bottom, as well as irrigated from the top.

Bio-oxidative reactions convert the copper in the copper sulphide minerals into extractable copper. The bio-oxidative reactions are performed by bioleaching bacteria. The bioleaching bacteria can modify their environment and establish self-sustaining colonies that maintain the conditions for copper leaching. To supply the oxygen required for the bio-oxidative reactions, the heap is aerated from the bottom while the acid percolates down through the heap.

As with any commercial venture, heap leach operations maximize economic returns by processing highly profitable ores first, and by deferring processing of less valuable portions of the ore body until later. This results in ores with the highest copper grades being mined first, so that the copper grade decreases with time. Regardless of the copper grade, in a typical leaching cycle most of the copper is recovered from the heap at the beginning of the leaching cycle, with less and less copper being extracted towards the end of the leaching cycle. In order to maximize the economic return of the heap, the diminishing returns typically compel the operation to terminate the leaching cycle before all of the available copper is recovered. All of these factors combine to create a situation where the ore being processed at the end of mine life is close in value to the heap leach residues discarded earlier in the life of the mine.

Leaching copper sulphide ore in heaps typically takes several months, with diminishing amounts of copper being extracted as time progresses. On reaching a target extraction value, a heap is taken off-line and allowed to drain down. The resulting heap leach residues are then decommissioned because it is more financially worthwhile to extract larger amounts of copper from fresh ore than to continue to extract the smaller amount of copper still present in the heap leach residues.

Decommissioning heap leach residues may be performed by moving the residues from the pad to a waste dump, capping the heap leach residues with an impermeable layer, or utilizing the decommissioned heap as a platform for stacking fresh ore as part of a new heap or heaps that are subsequently leached. In any case, the heap leach residues, with the remaining copper value, are typically abandoned even if not totally exhausted as a source of copper.

It is possible to further process heap leach residues using in-situ leaching techniques in order to further extract copper from abandoned leach residues.

U.S. Pat. No. 8,986,423 to Lang et al. describes a method for constructing a heap that incorporates wireline geophysical measurements to monitor, model, and operate a well injection system. Geophysical methods are used to improve leaching by surface irrigation and injection of leaching solution at multiple depths.

U.S. Pat. No. 8,186,607 to Guzman describes a method and system to improve irrigation and metallurgical performance of a heap by a combination of surface and subsurface irrigation, taking into account the permeability of the ore bed. The hydraulic properties of the heap determine the operating pressure of leach solution application, and the operating pressures are adjusted in response to changes in the hydraulic properties of the heap.

Canadian patent number 2,558,324 to Seal describes a method of selective leaching of a heap using geophysics to detect deficient regions, directed drilling of injection wells, and hydraulic fracturing. Wells are drilled in areas of the heap deemed to be leaching poorly, as determined by geophysical surveys. Those areas may be subjected to hydraulic fracturing prior to injecting leaching solution.

The scientific literature provides a number of examples where geophysics and injection wells have been used to recover copper from oxide dumps. These include, for example:

Rucker, D., 2016, "A billion gallons of experience: results from a long term subsurface heap leaching program", SME Annual Meeting & Expo, Phoenix, Ariz., Feb. 21-24, 2016;

Williams, G., Clayton, N., Lang, K., 2015. "Integrated approach to secondary copper recovery in historic stockpiles at the Asarco Ray Mine—a case study", Heap Leach Solutions 2015 Conference Proceedings, Infomine, Vancouver BC;

Rucker, D., Baldyga, C., Cubbage, B., 2015, "Investigating leaching alternatives for heterogeneous leach pads" Heap Leach Solutions 2015 Conference Proceedings, Infomine, Vancouver BC; and Rucker, D., 2015. "Deep well rinsing of a copper oxide heap", Hydrometallurgy, Volume 153, pages 145-153.

It is desirable to provide a method for recovering copper from heap leach residues.

SUMMARY

According to a first aspect, a process for recovering copper from heap leach residues is provided. The process includes identifying a production zone within the heap leach residues for secondary leaching, drilling wells into the heap at locations suitable for delivering leach solution into the production zone, injecting the leach solution including ferric ions through the wells and aerating the production zone to facilitate oxidative reactions within the production zone, and collecting effluent from the heap for copper recovery therefrom.

Other aspects and features of the present application will become apparent to those ordinarily skilled in the art upon review of the following description of specific embodiments of the application in conjunction with the accompanying figures.

BRIEF DESCRIPTION OF THE DRAWINGS

Embodiments of the present application will now be described, by way of example only, with reference to the attached figures, in which.

DETAILED DESCRIPTION

Figure 1:
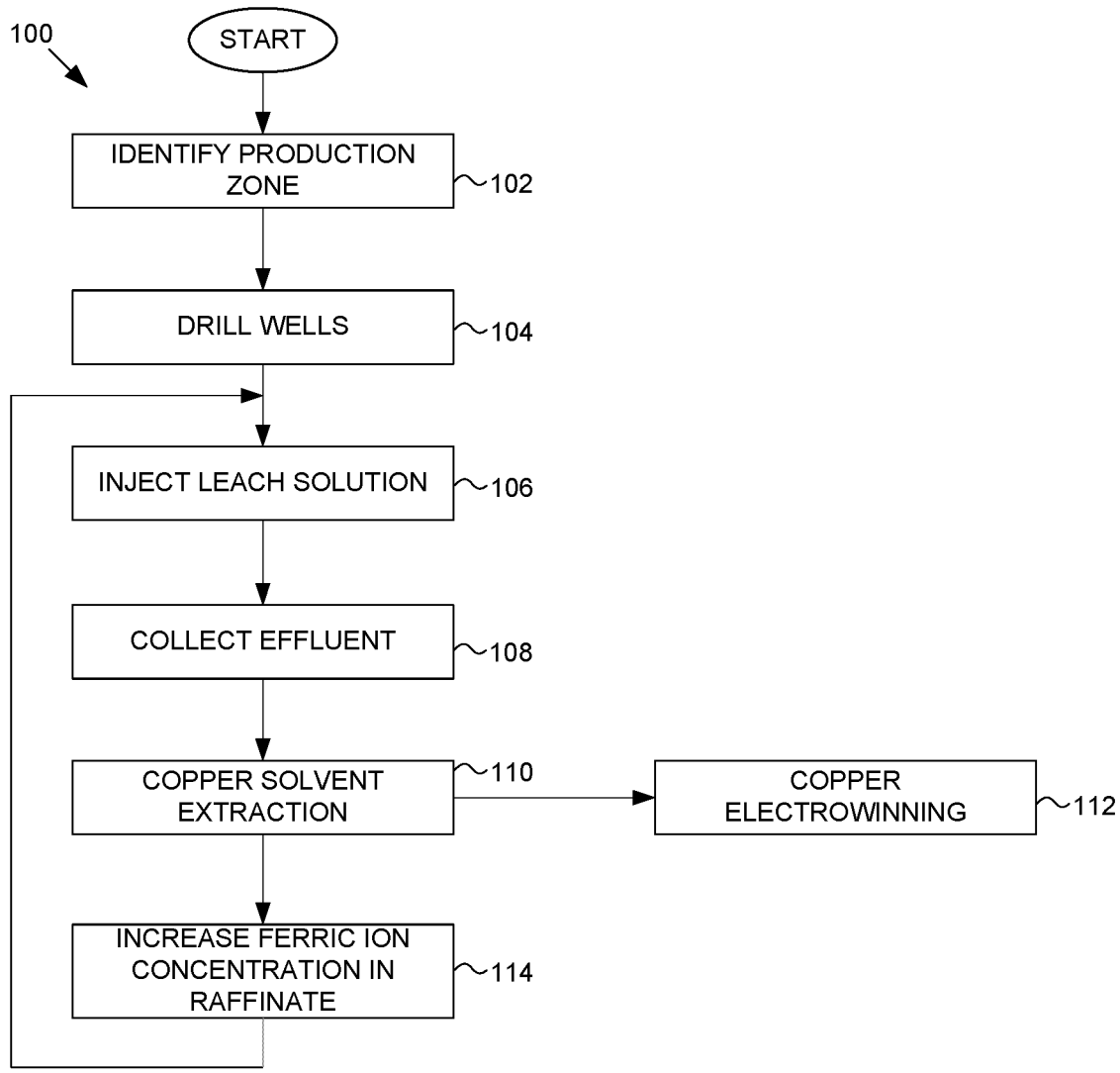
FIG. 1 is a simplified flow diagram illustrating a process for recovering copper from heap leach residues in accordance with an embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Generally, the present application provides a process for recovering copper from heap leach residues, the heap leach residues including primary, secondary, or mixtures of primary and secondary sulphides of copper. Heap leach residues used in the method can be obtained from leaching secondary sulphides of copper, such as chalcocite ($Cu_2S$) and covellite (CuS), from a supergene ore body, and/or from leaching primary sulphides of copper, such as chalcopyrite ($CuFeS_2$) and bornite ($Cu_5FeS_4$), mined from a hypogene ore body.

The disclosure generally relates to a process for recovering copper from heap leach residues. The process includes identifying a production zone within the heap leach residues for secondary leaching, drilling wells into the heap at locations suitable for delivering leach solution into the production zone, injecting the leach solution including ferric ions through the wells and aerating the production zone to facilitate oxidative reactions within the production zone, and collecting effluent from the heap for copper recovery therefrom.

Referring to FIG. 1, a simplified flow diagram illustrating a process for recovering copper from heap leach residues is indicated generally by the numeral 100. The process may contain additional or fewer processes than shown and described, and parts of the process may be performed in a different order.

The process is carried out to recover copper from previously leached and abandoned sulphide heaps, for example, on a pad, a waste dump, or utilized as a platform for leaching of another heap or heaps. Optionally, the heap may be buried underneath another abandoned heap. Alternatively, the heap may be buried underneath another heap that is still under operation, i.e., undergoing heap leaching.

A production zone is identified in a heap of previously crushed, stacked, and leached copper sulphide ore at 102. The production zone is identified by surveying the heap utilizing topographical and geophysical techniques to identify the boundaries of the production zone. The geophysical techniques may include electro-resistivity tomography (ERT).

Wellbores are drilled into the production zone at 104. The wellbores may be drilled in a regular pattern for the injection of leach solution into the production zone identified at 102. For example, the wellbores may be spaced from 20 m apart up to 40 m apart. The wellbores are located such that the spacing between adjacent wellbores is less than or equal to twice the vertical thickness of the production zone. The lowermost points of the wellbores are located at least 2 m above the lower boundary of the production zone. The wellbores are utilized as injection wells and are completed to include a wellhead at the surface and a pipe string below surface. The wellhead may include a surface casing, a block anchor, an inlet valve, a pressure gauge, and an air vent valve, and is configured to insert instruments, sensors, or other downhole equipment.

The wellbores may be drilled vertically, or may be drilled at an angle to the vertical of up to 20 degrees from the vertical. The drilling operation may provide samples that are utilized to identify the copper resource within the production zone.

The wellbores may be arranged in a regular pattern such as a hexagonal pattern, such that each well is surrounded by six nearest neighbours. Alternatively, the injection wells may be arranged in a square pattern, such that each well is surrounded by four nearest neighbours.

The pipe string below surface may include several pipe intervals joined together. The annular space surrounding the pipe string is packed with filler material. The portion of the pipe string that is located within the production zone includes a perforated pipe interval through which injected leach solution enters the production zone. The perforated interval is connected to the wellhead by intervals of solid pipe. The perforated interval extends upwardly from the bottom of the wellbore, terminating at a distance greater than 3 m from the upper boundary of the production zone such that the solid pipe interval(s) extend at least 3 m into the production zone. The upper 3 m of the production zone annular space may be packed with a wellbore seal to inhibit backflow of solution from the wellbore to the wellhead. When completed, the injection wells are not developed, meaning that no efforts are made to establish a hydraulic connection between the perforated interval of the pipe string and the surrounding solid material, thus helping to maintain air pockets within the wellbore.

The wellbore seal may be a layer of cement and bentonite packed into the annular space extending from the upper boundary of the production zone, downwardly about 2 m, and an underlying layer of bentonite pellets extending downwardly about a further 1 m within the annular space.

The wellhead assembly may be configured to insert a phreatic level sensor, or bailer for collecting solution samples. The wellhead assembly may also be configured to receive downhole equipment such as an electric submersible pump.

The injection wells may be twinned such that two pipe strings extend inside the same wellbore, with the wellhead injection flow being divided equally between the two twin pipe strings. The two twin pipe strings may terminate at different depths within the wellbore to direct the delivery of leaching solution at two different depths within the production zone.

Leach solution is injected into the production zone, via the injection wells at 106. The leach solution may include raffinate solution from a solvent extraction circuit, as referred to below. The raffinate solution includes at least 5 g/L sulphuric acid, at least 1.5 g/L ferric ions, a pH of 1.5 or less, and an oxidation-reduction potential of at least 720 mV as measured by silver/silver chloride electrode. The leach solution may be heated prior to injection, for the purpose of accelerating the copper leaching reactions within the production zone.

Optionally, the leach solution may include pregnant leach solution (PLS) from another heap, with the PLS containing at least 5 g/L sulphuric acid, at least 1.5 g/L ferric ions, a pH not higher than 1.5, and an oxidation-reduction potential of at least 720 mV as measured by silver/silver chloride electrode. Alternatively, the leach solution comprises an intermediate leach solution (ILS), with the ILS containing at least 5 g/L sulphuric acid, at least 1.5 g/L ferric ions, a pH not higher than 1.5, and an oxidation-reduction potential of at least 720 mV as measured by silver/silver chloride electrode.

The injection of leach solution may be carried out intermittently, by injecting the leach solution with periods of rest in which no leach solution is injected between periods of injection. The periods of injection of leach solution may be interrupted by periods of rest of equal duration. Before the start of a period of injection, the wellhead air vent valve may be closed. At the start of a period of injection, the leaching solution flow rate may be set at, for example, 0.5 L/s for one day, then increased to 1.0 L/s for one day, then increased to 1.5 L/s on the third day. During the periods of injection of leach solution, the injection flow rate at the wellhead may be less than or equal to 1.5 L/s and the total flow of the injection pattern may be less than or equal to 6 L/h per $m^2$ of the cross sectional area of the production zone. The injection pressure at the wellhead may be 30 psig or less. At the end of a period of injection of leach solution and beginning of the period of rest, the flow may be cut off by the closing of the wellhead inlet valve. The air vent valve is then opened to allow air to enter the wellbore and diffuse into the production zone below. The air vent may be kept open for the duration of the period of rest.

A geophysical survey of the production zone is completed before the first injection, and at least one geophysical survey is completed after at least one period of injection. The geophysical survey may be utilized to identify the wetting fronts from the injection wells. The duration of the periods of injection and periods of rest may be adjusted to ensure that the individual wetting fronts meet, to ensure contact between leaching solution and the solids within the production zone. During at least one period of rest, the phreatic levels may be measured in at least a portion of the injection wells. The total flow of the injector pattern may be adjusted such that the phreatic levels within the production zone are below a level at which the geotechnical stability of the heap is jeopardized.

Effluent, also referred to as pregnant leach solution (PLS), drains from the bottom of the production zone through the original drainage system of the abandoned heap and is collected at 108. The total flow of the injection pattern is adjusted such that all of the drainage exit pipes or conduits are less than or equal to one quarter full, to allow air to enter the production zone by way of the drainage system. The original heap drainage system may be cleared, or repaired, or enhanced, or rebuilt, to allow air to ingress the heap by way of the drainage system. Low-pressure air may be forced into the drainage system by way of a blower, to facilitate air to ingress the heap by way of the drainage system.

Alternatively, or in addition, production wells may be utilized and fitted with electric submersible pumps to collect the effluent, also referred to as pregnant leach solution (PLS). Data from geophysical surveys completed after one or more injection periods may be utilized to determine one or more locations for drilling of wellbores for the production wells. Optionally, one or more injection wells may be converted to a production well by installing an electric submersible pump to collect pregnant leach solution (PLS).

The pregnant leach solution is treated in a solvent extraction circuit at 110 followed by electrowinning at 112 to recover dissolved copper. During solvent extraction at 110, the copper is exchanged for acid, and a raffinate solution is returned that is utilized as the leach solution. During leaching of copper sulphides, dissolved ferric ions are reduced to ferrous ions in the production zone. The ferric ions in the raffinate are replenished by passing at least a portion of the raffinate through an aerated heap in which the ferrous ions are oxidized by bioleaching bacteria, thus increasing the ferric ion concentration in the raffinate at 114. In one example, the ferric ions are replenished in a bioleaching reactor such as a stirred tank, fluidized bed, or packed bed bioreactor.

The leaching performance of the production zone may be assessed by comparing the composition of the incoming leaching solution with that of the exiting effluent or pregnant leach solution (PLS). In particular, concentration differences, may be measured in grams per litre, and calculated by subtracting the inlet concentration from the outlet concentration. The concentration of sulphuric acid, copper, and ferric ions may all be determined. A decrease in sulphuric acid concentration divided by the increase in copper concentration that is greater than 1.54, indicates that the production zone is under oxidizing conditions and copper is extracted by biologically assisted leaching. A decrease in sulphuric acid concentration divided by an increase in copper concentration less than 1.54, and a decrease in ferric ion concentration divided by an increase in copper concentration greater than 1.76, is indicative that the production zone is under partial oxidizing conditions and copper is extracted primarily by chemical reaction with ferric ions. A decrease in ferric ion concentration divided by an increase in copper concentration less than 1.76, is indicative that the production zone is not under oxidizing conditions and ferric ions are precipitating. A pH of greater than 1.5 indicates that there is potential for ferric ion precipitation.

Figure 2:
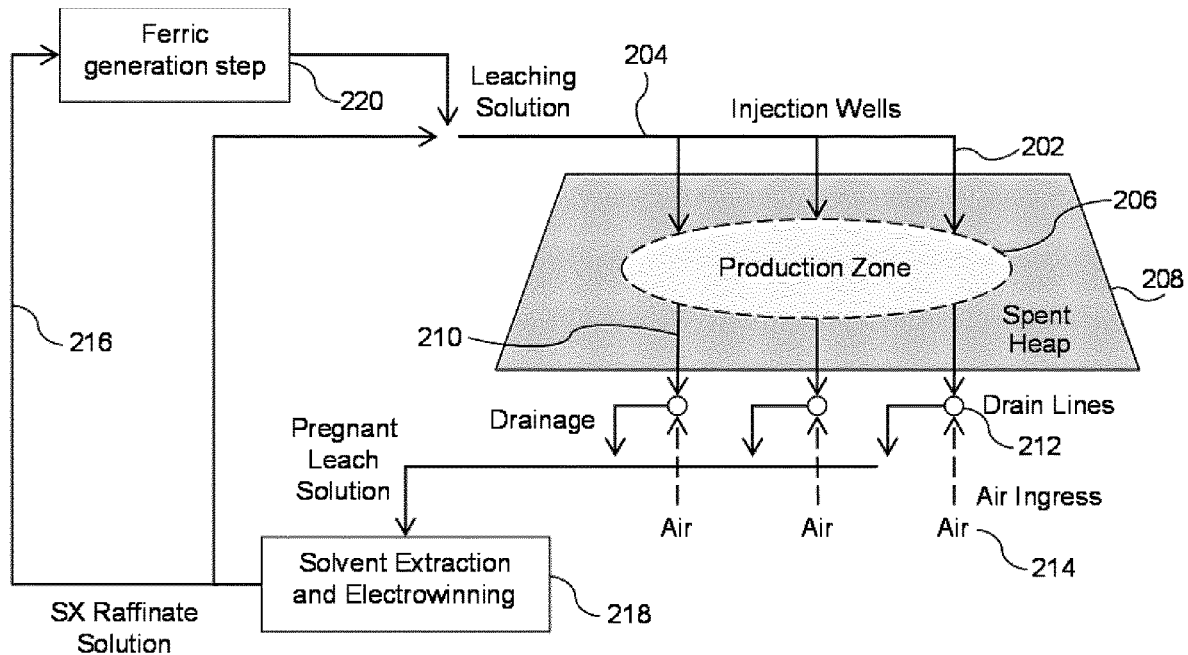
FIG. 2 is a schematic representation of the process for recovery copper from heap leach residues of FIG. 1.

Referring to FIG. 2, a schematic representation of an example of a process for recovery copper from heap leach residues is illustrated. In the schematic representation of FIG. 2, three wellbores are drilled and completed to provide three injection wells 202 to deliver leach solution 204 to three locations within the production zone 206 in the heap 208. Three wellbores are shown only for the purpose of illustration and other numbers of wellbores may be successfully implemented. The leach solution 204 is injected into the production zone 206, via the injection wells 202. The injection of leach solution 204 may be carried out intermittently, by injecting the leach solution 204 with periods of rest in which no leach solution is injected between periods of injection.

The pregnant leach solution (PLS) 210, drains from the bottom of the production zone through the original drainage system 212 of the heap and is collected. Low-pressure air 214 is forced into the drainage system by way of a blower, to facilitate air to ingress the heap by way of the drainage system.

The pregnant leach solution is treated to recover the copper by solvent extraction and electrowinning 218. The raffinate from the solvent extraction circuit is split and part of the raffinate 216 is passed through a bioleaching reactor 220 to replenish the ferric ion concentration. The two raffinate streams are returned and utilized as the leach solution 204.

The method of secondary leaching of spent or abandoned sulphide heaps is carried out as shown in FIG. 2. An acidic leach solution containing ferric ions is injected into a spent heap where the copper sulphide minerals undergo oxidative dissolution:

$$Cu_2S + 4Fe^{3+} \rightarrow 2Cu^{2+} + 4Fe^{2+} + S \text{(chalcocite leaching by ferric ions)} \quad (1)$$

$$CuS + 2Fe^{3+} \rightarrow Cu^{2+} + Fe^{2+} + S \text{(covellite oxidation by ferric ions)} \quad (2)$$

$$CuFeS_2 + 4Fe^{3+} \rightarrow Cu^{2+} + 5Fe^{2+} + S \text{(chalcopyrite oxidation by ferric ions)} \quad (3)$$

$$Cu_5FeS^4 + 12Fe^{3+} \rightarrow 5Cu^{2+} + 13Fe^{2+} + 4S \text{(bornite oxidation by ferric ions)} \quad (4)$$

As copper is leached, the reactant ferric ions are consumed, reduced to ferrous ions. The resulting ferrous ions are oxidized back to ferric ions within the heap, at another location, or through a combination of both. The oxidative generation of ferric ions consumes oxygen and acid according to the reaction:

$$4Fe^{2+} + 4H^+ + O_2 \rightarrow 4Fe^{3+} + 2H_2O \text{(ferrous ion oxidation)} \quad (5)$$

The reaction is catalyzed by, for example, bioleaching bacteria. Dissolved oxygen may be obtained from air. Acid is replenished by the bacterial oxidation of the elemental sulphur generated during copper leaching:

$$S + 1.5O_2 + H_2O \rightarrow H_2SO_4 \text{(sulphur oxidation)} \quad (6)$$

The particle size of the abandoned heap may be 25 mm or lower. A particle size of 19 mm or lower is preferable. More preferably, a particle size of the abandoned heap is 12 mm or lower. The material in the heap may or may not be agglomerated prior to stacking.

As indicated, the production zone is operated with periods of injection alternating with rest periods of equal duration. During periods of injection, the wellhead air vent valve is closed and the inlet valve is open. During rest periods, the wellhead inlet valve is closed and the air vent valve is open.

The period of injection ends when the average extensions of the individual wetting fronts meet. The extension of the wetting fronts is indicated by comparing the results of at least one geophysical survey after injection with the results of at least one geophysical survey before injection.

Phreatic levels are measured in at least a portion of the injection wells and a period of injection also terminates when the phreatic levels within the production zone rise to or beyond a value that jeopardizes the geotechnical stability of the heap.

During periods of injection, the injection flow rate at the wellhead does not exceed 1.5 L/s and the total flow of the injection pattern does not exceed 6 L/h per m² of production zone area. The injection wellhead pressure does not exceed 30 psig. From the start of injection, the wellhead inlet flow rate may be increased in daily increments of 0.5 L/s until reaching the desired flow rate.

During periods of continuous injection, the effluent exits via heap drainage pipes that are one quarter full or less, facilitating air ingress to the heap. The drainage pipe flows are maintained by keeping such drain pipes cleared of sediments and adjusting the total solution flow to the injection pattern.

The leaching solution injected into the production zone comprises raffinate solution from the solvent extraction circuit or pregnant leach solution (PLS) from another heap, with the solution including at least 5 g/L sulphuric acid, at least 1.5 g/L ferric ions, a pH not higher than 1.5, and an oxidation-reduction potential of at least 720 mV as measured by silver/silver chloride electrode.

The leaching solution injected includes at least 5 g/L sulphuric acid, at least 1.5 g/L ferric ions, a pH not higher than 1.5, and an oxidation-reduction potential of at least 720 mV as measured by silver/silver chloride electrode. Such leaching solution comprises pregnant leach solution (PLS) from another heap, an intermediate leach solution (ILS), or a combination thereof.

Figure 3:
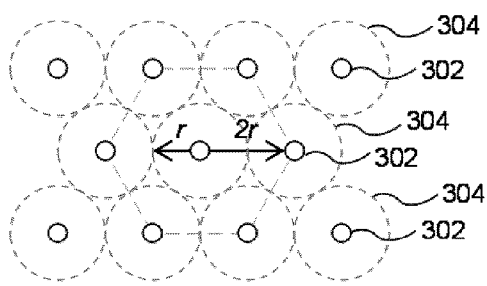
FIG. 3 illustrates an example of a pattern of injection wells in the process for recovering copper of FIG. 1.

One example of a pattern of injection wells is illustrated in the top schematic view of FIG. 3. As shown, the injection wells 302 are arranged to form a generally hexagonal pattern such that one injection well 302 is adjacent and equally spaced from 6 injection wells. The six adjacent wells 302 are generally located at vertices of a hexagon centered on the first injection well 302. The distance between adjacent injection wells is from about 20 m to about 40 m. The injection wells 302 are spaced such that the wetting fronts 304 of adjacent injection wells meet during injection of leach solution.

Figure 4:
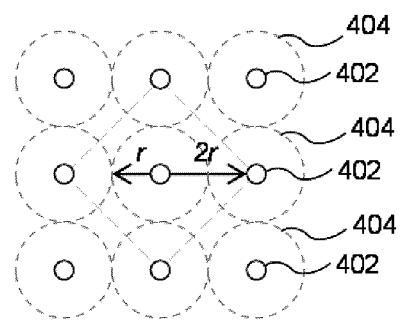
FIG. 4 illustrates another example of a pattern of injection wells in the process for recovering copper of FIG. 1.

Another example of a pattern of injection wells is illustrated in FIG. 4. In this example, the injection wells 402 are arranged to form a generally square pattern such that one injection well 402 is adjacent and equally spaced from 4 other injection wells. The four adjacent wells 402 are generally located at vertices of a square centered on the first injection well 402. The distance between adjacent injection wells is from about 20 m to about 40 m. The injection wells 402 are spaced such that the wetting fronts 404 of adjacent injection wells meet during injection of leach solution.

Figure 5:
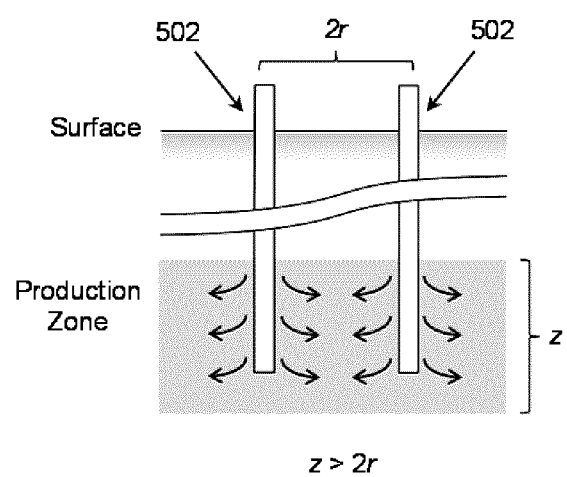
FIG. 5 is a schematic sectional view of injection wells utilized in the process for recovering copper of FIG. 1.

A schematic sectional view of injection wells utilized in the process for recovering copper is shown in FIG. 5. The injection wells 502 are utilized to deliver the leach solution to a production zone that has an identified thickness denoted as z. The separation between two adjacent injection wells is less than the thickness of the production zone, i.e., the injection well spacing is less than z.

Figures 6, 7, 8:
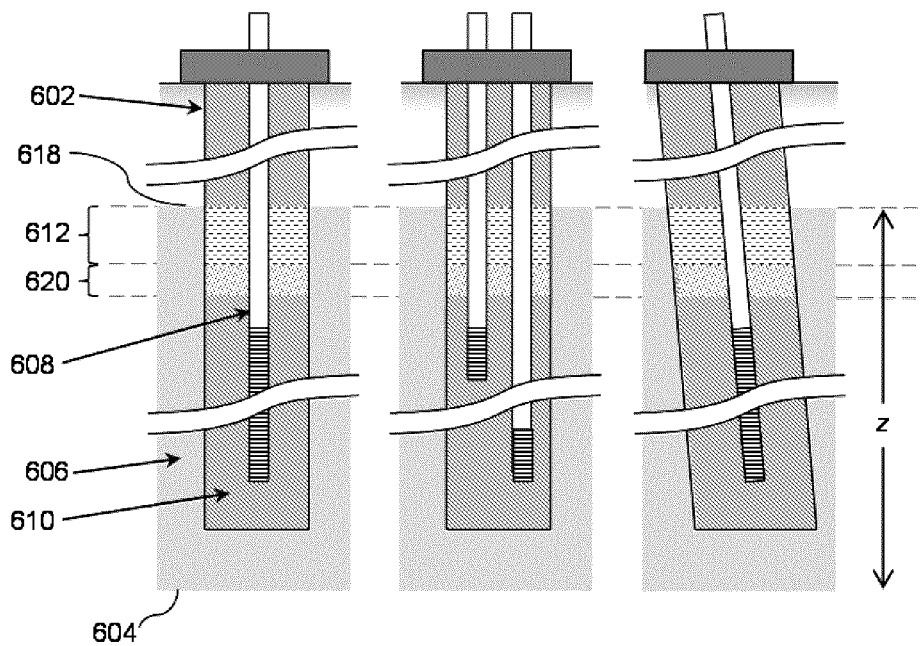
FIG. 6, FIG. 7, and FIG. 8 are schematic views illustrating injection well types for use in the process for recovering copper of FIG. 1.

FIG. 6, FIG. 7, and FIG. 8 illustrate three different injection well types for use in the process for recovering copper. The injection well pipe strings extend within the injection wellbore, which may be drilled vertically, as shown in FIG. 6, or at an angle up to 20 degrees from the vertical, as shown in FIG. 8. Injection wells may include a single pipe string within the wellbore, as illustrated in FIG. 6 and FIG. 8. Alternatively, the injection wells may be twinned, with two pipe strings inside the same wellbore, as shown in FIG. 7. In a twin injection well, the two twin pipe strings terminate at different depths within the production zone, each pipe string delivering approximately one half of the total solution flow to the well.

Referring to FIG. 6, the injection wellbores 602 are drilled to a distance of 2 m or more from the lower boundary 604 of the production zone 606. Within the wellbore 602, the pipe string 608, includes several pipe intervals joined together, and surrounded by filler material 610 that packs the annular space. Within the production zone 606, the upper 3 m of the annular space is packed with the wellbore seal 612 that inhibits backflow. The wellbore seal 612 includes a layer of cement and bentonite that extends for 2 m into the production zone 606 from its upper boundary 618, and an underlying layer of bentonite pellets 620 that extends down into the production zone 606 a further 1 m.

Also within the production zone 606, a portion of the pipe string 608 includes a perforated pipe interval that delivers injected solution to the production zone 606. The perforated interval extends for a distance between the bottom of the wellbore and the wellbore seal.

The injection wells illustrated in FIG. 7 and FIG. 8 are similarly constructed and therefore are not described again in detail herein.

Figure 9:
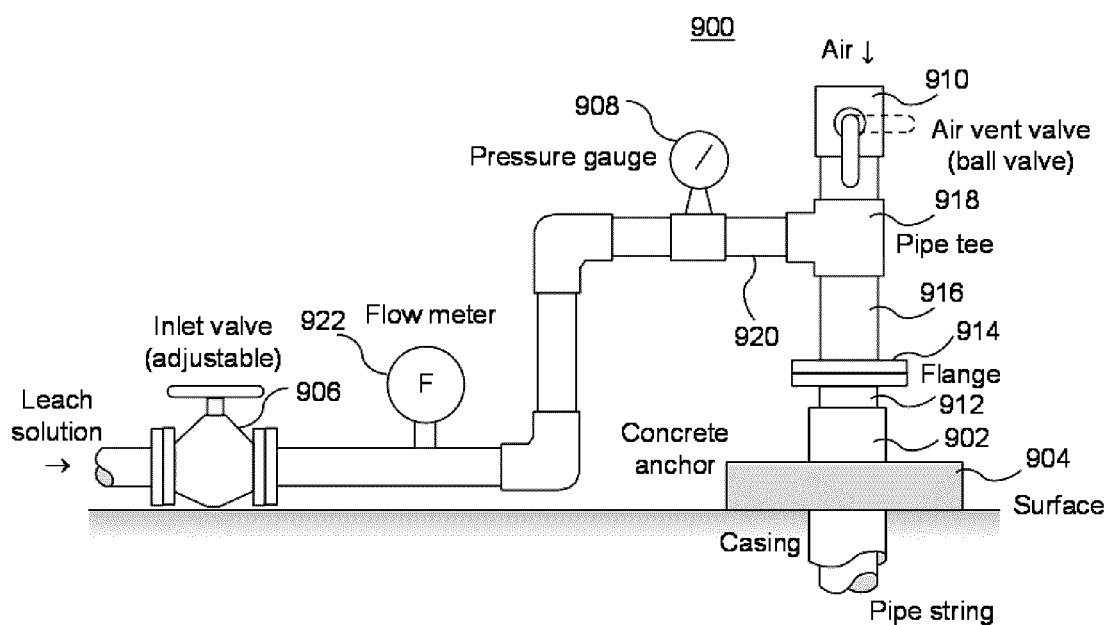
FIG. 9 is a side view illustrating an example of an injection well head assembly in accordance with an aspect of the present invention.

FIG. 9 illustrates one example of an injection well head assembly 900 utilized in the process for recovering copper. The injection wellhead assembly 900 includes a surface casing 902, a block anchor 904, an inlet valve 906, a pressure gauge 908, and an air vent valve 910, and is configured for the insertion of instruments, sensors, or other downhole equipment.

The uppermost end of the pipe string 912 terminates in a flange 914 above the surface. The flange 914 attaches the pipe string 912 to a pipe section 916 of equal inside diameter. That top pipe section is joined to the main line of a tee pipe section 918 also of equal inside diameter. The other end of the tee pipe section main line is connected to a ball valve that serves as an air vent valve 910 that opens to atmosphere. When opened, the air vent valve 910 provides a continuous conduit of uniform inside diameter all the way from atmosphere to the bottom of the pipe string 912.

The branch of the tee pipe section receives a solution inlet pipe section 920 fitted with the pressure gauge 908. Upstream of the pressure gauge 908, the inlet pipe section 920 is connected to the inlet valve 906 and a flowmeter 922 that control and regulate the flow of incoming leach solution.

The following examples are submitted to further illustrate various embodiments of the present invention. These examples are intended to be illustrative only and are not intended to limit the scope of the present invention.

Two field trials of secondary leaching in sulphide heaps were carried out.

EXAMPLE 1

An initial, relatively small scale test utilized injection wells arranged generally in a pattern. This test involved a production zone generally trapezoidal in shape, covering an area of 3,217 m$^2$. Overlaid material was removed such that the production zone was exposed to surface. The production zone had an average depth of 9.67 m, such that the overall volume was 31,110 m$^3$. A schematic of the initial small scale test production zone is shown in FIG. 10.

Figure 10:
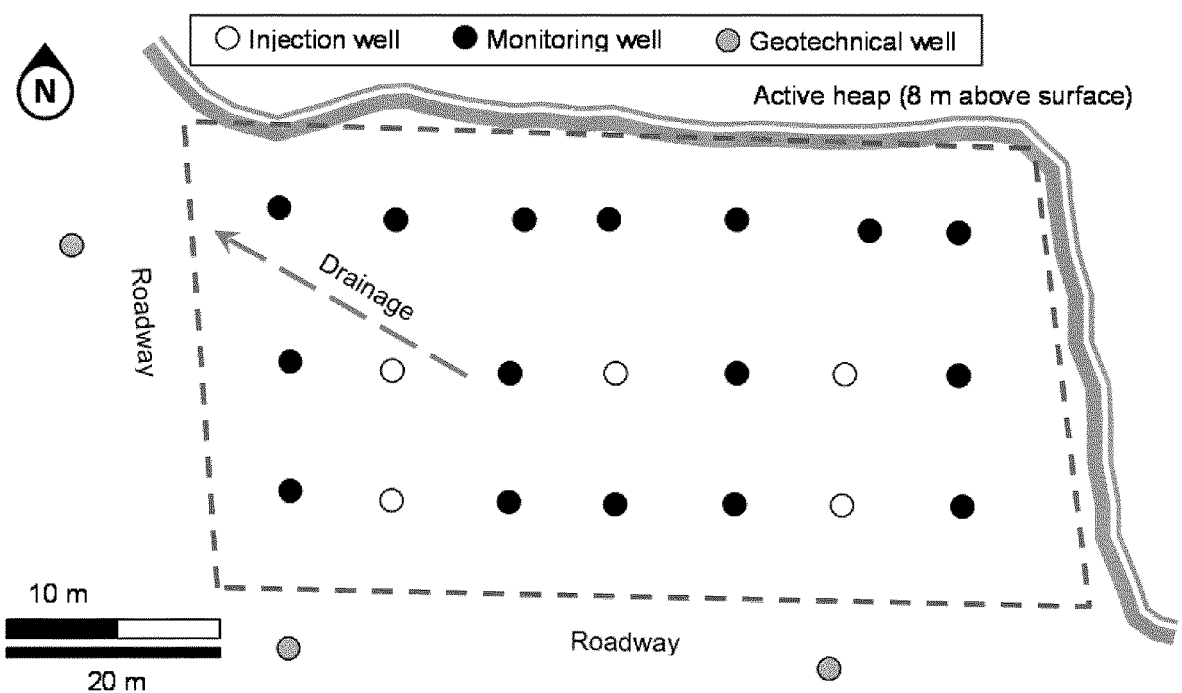
FIG. 10 is a schematic view illustrating well location in a test process according to FIG. 1.
Figure 11:
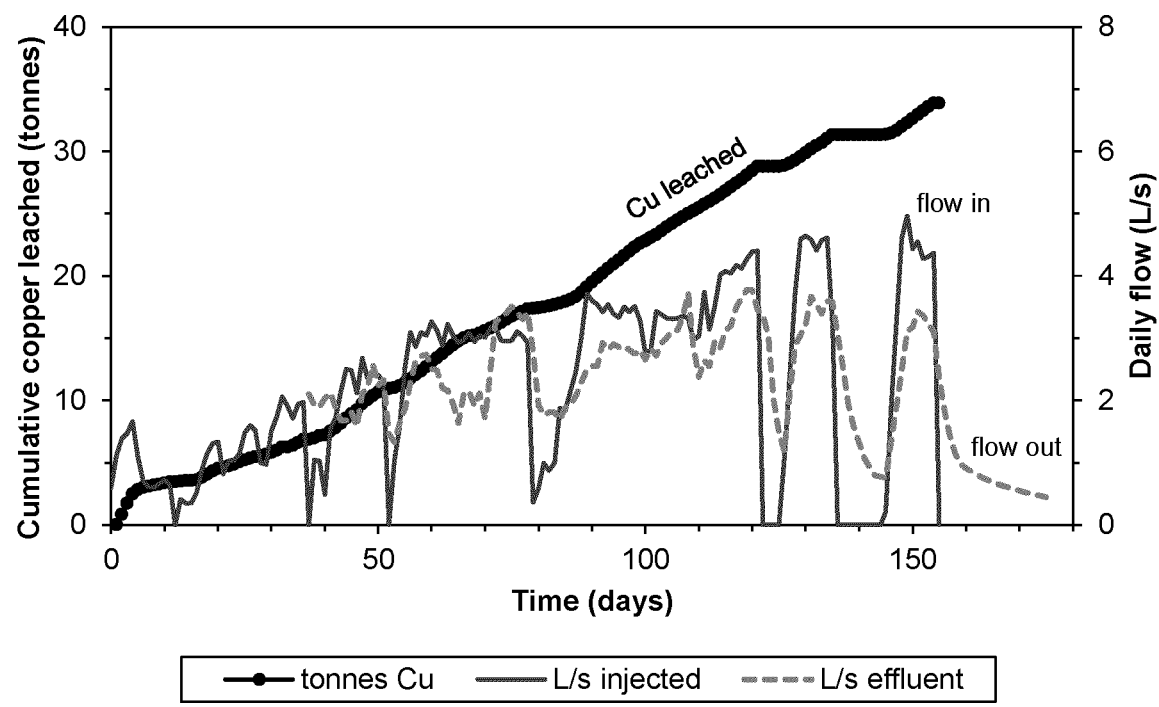
FIG. 11 is a graph showing solution flow and metal production from the test process of FIG. 10.

Five injection wells and 16 monitoring wells were completed within the production zone, as illustrated in FIG. 10. During the test period, about 32,230 m$^3$ of solution was injected over a period of 155 days, utilizing sometimes one, two, or three injection wells. Injection flow at the individual wells ranged from 0.35 L/s to as high as 1.7 L/s. The injection was most stable when the flow did not exceed 1.5 L/s per well. Total combined injection flow ranged from 0.9 L/s to 3.6 L/s, or 1.0 L/m$^2$·h to 4.0 L/m$^2$·h when measured as a function of production zone cross-sectional area. The leaching solution injected into the production zone included raffinate solution from a solvent extraction (SX) plant. The raffinate solution included, on average, 5.7 g/L sulphuric acid, 1.7 g/L total dissolved iron, 1.5 g/L ferric ions, had a pH of 1.7 and an oxidation-reduction potential of 725 mV. Copper was leached continuously over the course of the test. The quantity of leached copper totaled approximately 34 tonnes after 155 days. Solution flow and copper production versus time from the test of FIG. 10 is shown in FIG. 11.

Figure 12:
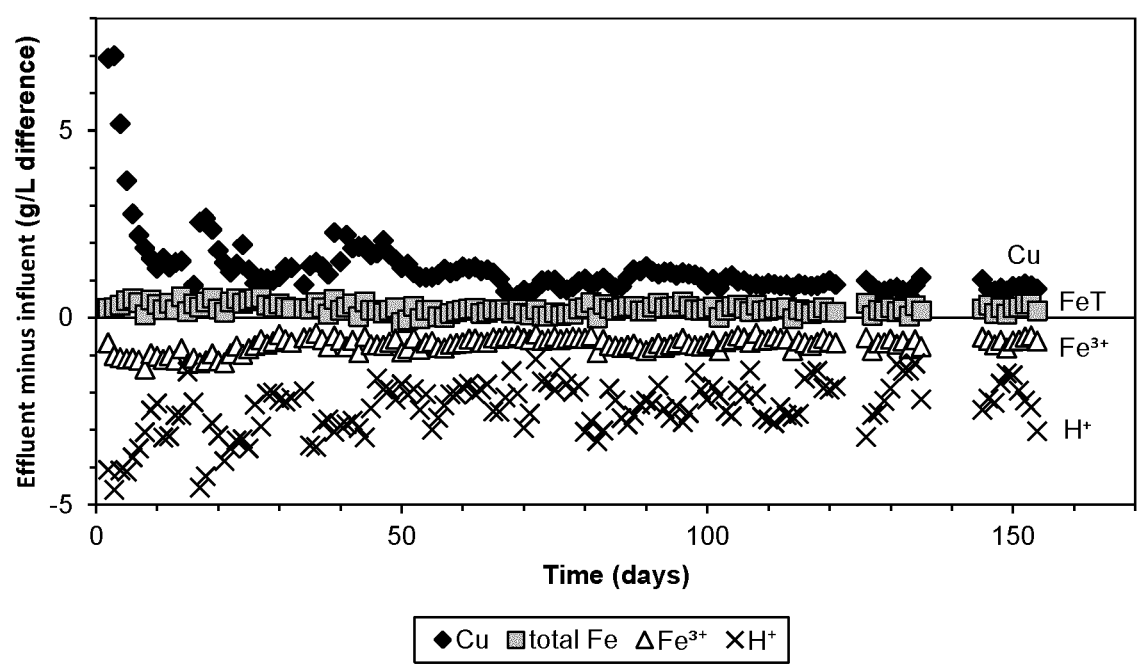
FIG. 12 is a graph showing changes in concentration of Copper and Iron over time, effluent v. influent from the test process of FIG. 10.

The concentrations of copper, iron, ferric ion, and sulphuric acid in leach solution injected and effluent pregnant leach solution (PLS) provided indicators of oxidative leaching of copper. The concentrations of each over time are illustrated in the graph of FIG. 12. The graph illustrates the changes in these concentrations, calculated by subtracting the daily influent concentrations from the corresponding effluent values. The change in total dissolved iron was small but positive, indicating that little or no precipitation of ferric ion occurred. Otherwise, the change in total dissolved iron would have been negative.

The change in ferric ion was positive and relatively constant, indicating generally constant consumption of ferric ion during copper leaching.

Figure 13:
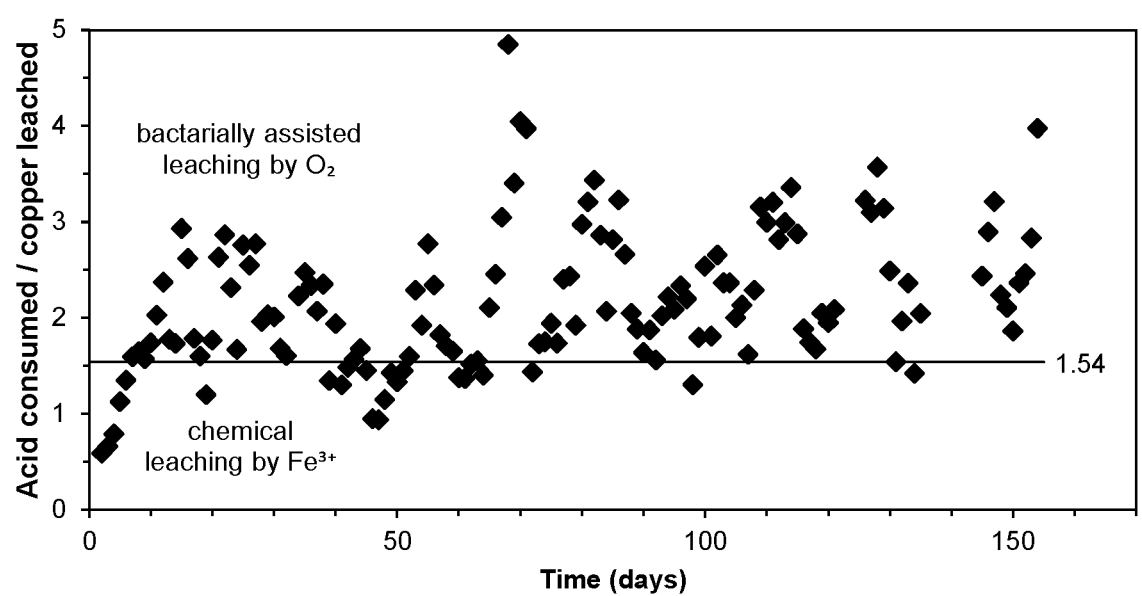
FIG. 13 is a graph showing acid consumption v. copper production over time from the test process of FIG. 10.

The change in sulphuric acid was negative, large, and opposite to the change in copper. This indicates that copper sulphides reacted with ferric ions to produce dissolved copper ions and ferrous ions, with the ferrous ions being oxidized back to ferric ions by bioleaching bacteria through the consumption of oxygen and acid, thus perpetuating the copper leaching reactions. Indeed, the mass ratio of acid consumed to copper leached was greater than 1.54 during almost the entire duration of the test, as shown in the graph of FIG. 13. The 1.54 value for the ratio of acid consumed to copper leached is derived from the chemical reactions:

$$Cu_2S + 4Fe^{3+} \rightarrow 2Cu^{2+} + 4Fe^{2+} + S \text{(chalcocite leaching by ferric ions)} \quad (1);$$

$$4Fe^{2+} + 4H^+ + O_2 \rightarrow 4Fe^{3+} + 2H_2O \text{(ferrous ion oxidation by bacteria)} \quad (5); \text{ and}$$

$$Cu_2S + 4H^+ + O_2 \rightarrow 2Cu^{2+} + 2H_2O + S \text{(overall)} \quad (7),$$

where 4H+ is equivalent to two molecules of sulphuric acid ($H_2SO_4$). In this instance, chalcocite ($Cu_2S$) is utilized as the example because it is the most common copper sulphide mineral exploited in heap leach operations. The overall oxidative leaching of chalcocite consumes one mole of sulphuric acid per mole of copper ions dissolved: a mass ratio of 1.54. Therefore a mass ratio greater than 1.54 indicates that there is more than enough acid consumption to support oxidative copper leaching.

EXAMPLE 2

Figure 14:
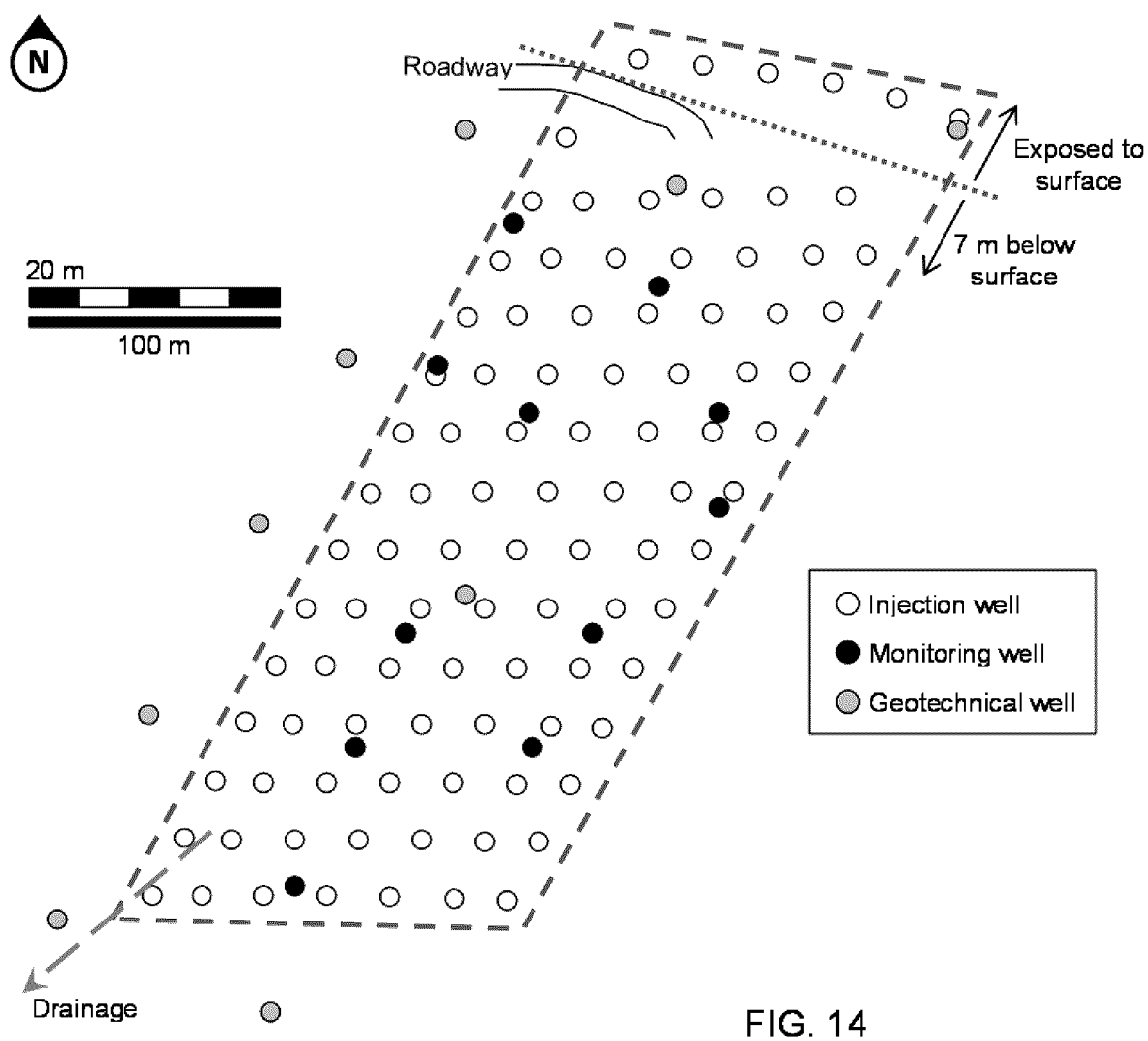
FIG. 14 is a schematic view illustrating well location in another test process according to FIG. 1.

A second test, much larger than the first test, included injection wells arranged in a hexagonal pattern as illustrated in the schematic view of the production zone of FIG. 14. This test included a production zone having a cross-sectional area of approximately 60,000 $m^2$ and a thickness that ranged from 8 m to 12 m, such that the overall volume was estimated at about 599,350 $m^3$. Most of the production zone was buried underneath 7 m of similar material with only a small portion exposed to surface.

97 injection wells and 11 monitoring wells were completed within the production zone, as shown in FIG. 14. Some of the injection wells were simple injection wells and some were twinned injection wells.

About 1.2 million $m^3$ of solution was injected over a period of one year, utilizing between 21 and 49 injection wells at any one time, in various combinations. Injection was continuous at times and interrupted by rest periods at other times. Injection flows at the individual wells did not exceed 1.5 L/s. Total combined injection flows ranged from 20 L/s to 80 L/s, or 1.2 $L/m^2 \cdot h$ to 4.8 $L/m^2 \cdot h$ when measured as a function of production zone cross-sectional area.

Figure 15:
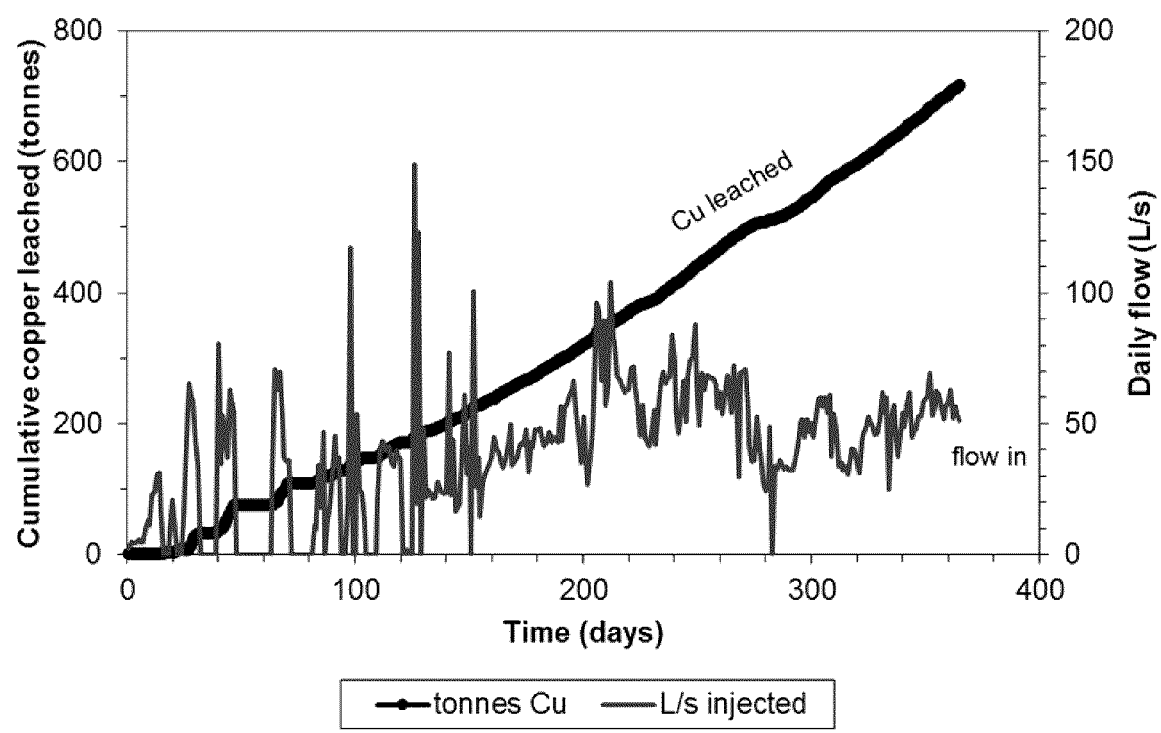
FIG. 15 is a graph showing solution flow and metal production from the test process of FIG. 14.

The leaching solution injected into the production zone included raffinate solution from a solvent extraction (SX) plant. The raffinate solution included, on average, 4.0 g/L sulphuric acid, 1.5 g/L total dissolved iron, 1.3 g/L ferric ions, had a pH of 1.7 and an oxidation-reduction potential of 725 mV. Copper was leached continuously over the course of the test, the quantity of leached copper totaling approximately 715 tonnes after one year. Solution flow and copper production versus time from the test of FIG. 14 is shown in FIG. 15.

Figure 16:
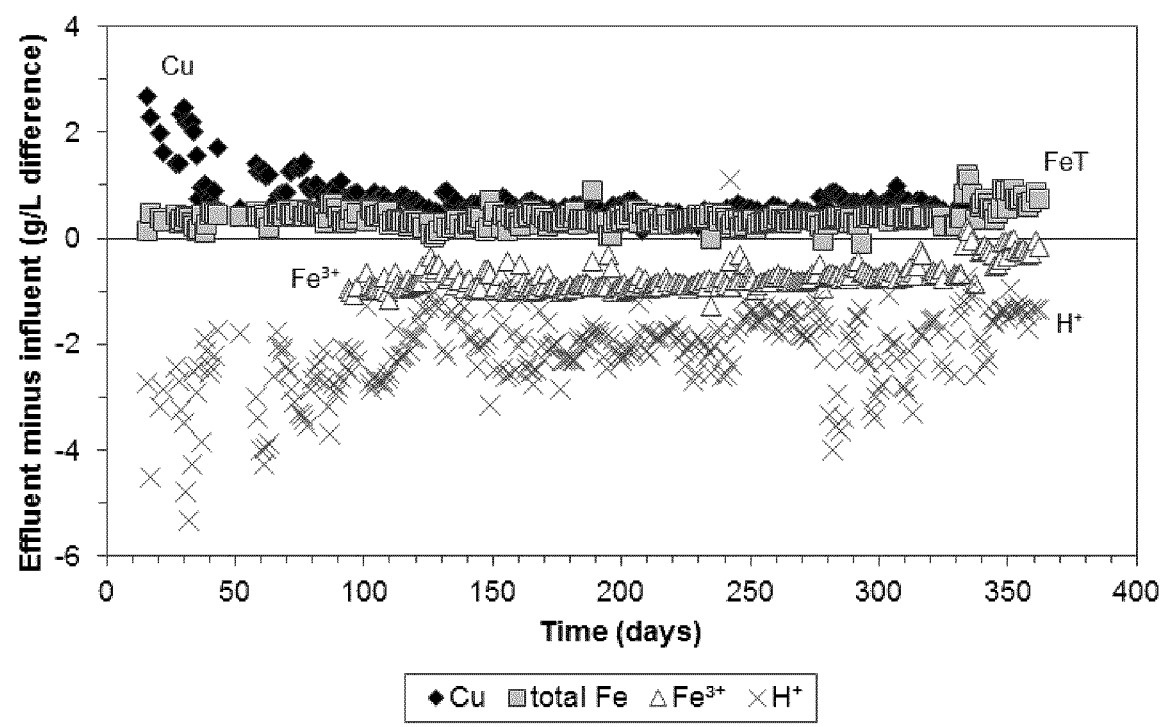
FIG. 16 is a graph showing changes in concentration of Copper and Iron over time, effluent v. influent from the test process of FIG. 14.

The concentrations of copper, iron, ferric ion, and sulphuric acid in leach solution injected and effluent pregnant leach solution (PLS) provided indicators of oxidative leaching of copper. The concentrations of each over time are illustrated in the graph of FIG. 16. The graph illustrates the changes in these concentrations, calculated by subtracting the daily influent concentrations from the corresponding effluent values. The change in total dissolved iron was small but positive, indicating that little or no precipitation of ferric ion occurred. Otherwise, the change in total dissolved iron would have been negative.

The change in ferric ion was positive and relatively constant, indicating that there was generally constant consumption of ferric ion during copper leaching.

Figure 17:
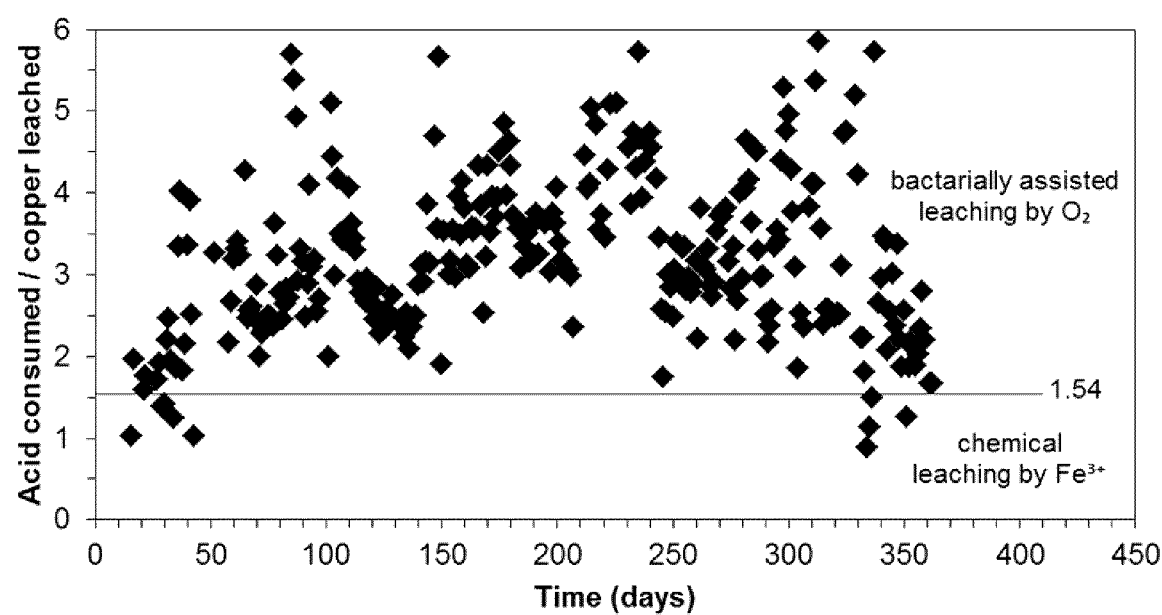
FIG. 17 is a graph showing acid consumption v. copper production over time from the test process of FIG. 14.

The change in sulphuric acid was negative and large in magnitude. This large change is indicative of copper sulphides reacting with ferric ions to produce dissolved copper ions and ferrous ions, with the ferrous ions being oxidized back to ferric ions by bioleaching bacteria through the consumption of oxygen and acid, thus perpetuating the copper leaching reactions. The mass ratio of acid consumed to copper leached was greater than 1.54 during most of the test, as shown in FIG. 17. A mass ratio greater than 1.54 indicates that there is more than enough acid consumption to support oxidative copper leaching.

Advantageously, copper is recovered from spent or abandoned sulphide heaps by secondary leaching utilizing injection wells and geophysical techniques.

In the preceding description, for purposes of explanation, numerous details are set forth in order to provide a thorough understanding of the embodiments of the application. However, it will be apparent to one skilled in the art that these specific details are not required in order to practice the application.

The above-described embodiments of the application and the examples are intended to be examples only. Alterations, modifications and variations can be effected to the particular embodiments by those of skill in the art without departing from the scope of the application, which is defined solely by the claims appended hereto.

What is claimed is:

1. A process for recovering copper from heap leach residues containing residual copper, the process comprising:
    identifying a production zone within a heap of the heap leach residues for secondary leaching;
    drilling wells into the heap at locations suitable for delivering leach solution including sulfuric acid and ferric ions into the production zone;
    injecting the leach solution including the sulfuric acid and ferric ions through the wells and aerating the production zone to facilitate oxidative reactions within the production zone; and
    collecting effluent from the heap via drainage conduits for copper recovery from the effluent,
    wherein the leach solution is injected at a flow rate such that the drainage conduits are less than full to facilitate air entry into the production zone via the drainage conduits and aerating comprises blowing air through drainage conduits and into the production zone.

2. The process according to claim 1, wherein drilling wells comprises drilling a plurality of wells.

3. The process according to claim 1, wherein the wells are spaced from 20 meters to 40 meters apart.

4. The process according to claim 1, wherein the wells are spaced apart a distance that is less than or equal to twice a vertical thickness of the production zone.

5. The process according to claim 1, wherein injecting the leach solution comprises intermittently injecting the leach solution with periods of rest in which no leach solution is injected in between periods of injection.

6. The process according to claim 5, wherein a duration of the periods of injection is sufficient for wetting fronts from the wells to meet to thereby provide contact between the leaching solution and solids within the production zone.

7. The process according to claim 5, comprising measuring phreatic levels in at least a portion of the wells during one or more of the periods of rest and selecting a flow rate of leach solution to maintain geotechnical stability of the heap.

8. The process according to claim 1, wherein injecting the leach solution comprises injecting the leach solution at a flow rate of less than or equal to 1.5 L/s.

9. The process according to claim 1, wherein injecting the leach solution comprises injecting the leach solution at a rate of 6 L/h per $m^2$ of cross-sectional area of the production zone.

10. The process according to claim 1, wherein injecting the leach solution comprises injecting leach solution into the wells at a flow rate such that drainage conduits from the heap are less than or equal to one quarter full, to facilitate air entry into the production zone via the drainage conduits.

11. The process according to claim 1, wherein injecting leach solution comprises injecting at a pressure of less than or equal to 30 psig.

12. The process according to claim 1, wherein aerating the production zone comprises opening an air vent valve in wellheads of the wells to facilitate flow of air into the production zone.

13. The process according to claim 1, comprising treating the effluent from the heap by solvent extraction to extract the copper.

14. The process according to claim 13, wherein at least a portion of a raffinate solution from the solvent extraction is returned to the heap such that at least a portion of the leach solution comprises the raffinate from the solvent extraction.

15. The process according to claim 14, wherein a second portion of the raffinate solution is passed through an aerated heap in which ferrous ions are oxidized by bioleaching bacteria to provide the ferric ions.

16. The process according to claim 1, wherein identifying a production zone within the heap leach residues for secondary leaching comprises geophysically surveying the heap.

17. The process according to claim 16, wherein geophysically surveying comprises surveying by electro-resistivity tomography.

18. The process according to claim 1, comprising comparing a composition of the leach solution to a composition of the effluent from the heap.

19. The process according to claim 18, comprising determining a sulfuric acid concentration decrease and a copper concentration increase.

20. The process according to claim 19, wherein the sulfuric acid concentration decrease and the copper concentration increase are utilized to determine whether the production zone is under oxidizing conditions and copper is extracted.

21. The process according to claim 1, wherein the wells are drilled vertically or at an angle of up to 20 degrees from vertical.

22. The process according to claim 1, wherein the wells are arranged in a square pattern or a hexagonal pattern.

23. The process according to claim 1, wherein at least one of the wells is twinned such that two pipe strings are utilized and wherein injecting the leach solution comprises injecting leach solution into each of the two pipe strings to deliver the leach solution at two different depths within the production zone.

24. The process according to claim 1, comprising heating the leach solution prior to the injecting.

25. The process according to claim 1, wherein collecting effluent from the heap comprises collecting effluent via production wells extending into the heap.

* * * * *